United States Patent
Ke

(10) Patent No.: US 11,055,231 B2
(45) Date of Patent: Jul. 6, 2021

(54) DATA STORAGE DEVICES AND DATA PROCESSING METHODS OF SKIPPING EDITING OF FIELDS IN H2F TABLE WHEN CONSECUTIVE ADDRESSES ARE PRESENT IN F2H TABLE

(71) Applicant: Silicon Motion, Inc., Jhubei (TW)

(72) Inventor: Kuan-Yu Ke, Zhubei (TW)

(73) Assignee: SILICON MOTION, INC., Jhubei (TW)

( * ) Notice: Subject to any disclaimer, the term of this patent is extended or adjusted under 35 U.S.C. 154(b) by 0 days.

(21) Appl. No.: 16/849,214

(22) Filed: Apr. 15, 2020

(65) Prior Publication Data

US 2020/0371952 A1 Nov. 26, 2020

(30) Foreign Application Priority Data

May 20, 2019 (TW) ................... 108117321

(51) Int. Cl.
*G06F 12/1009* (2016.01)
(52) U.S. Cl.
CPC .. *G06F 12/1009* (2013.01); *G06F 2212/7201* (2013.01)

(58) Field of Classification Search
CPC ............... G06F 12/1009; G06F 2212/7201
See application file for complete search history.

(56) References Cited

U.S. PATENT DOCUMENTS

2019/0286570 A1* 9/2019 Miura ............... G06F 12/0864
2019/0391915 A1* 12/2019 Kim .................. G06F 3/0656

* cited by examiner

*Primary Examiner* — Chie Yew
(74) *Attorney, Agent, or Firm* — McClure, Qualey & Rodack, LLP

(57) ABSTRACT

A data storage device includes a memory device and a memory controller. The memory controller selects a predetermined memory block to receive data and records multiple logical addresses in a first mapping table. When the predetermined memory block is full, the memory controller edits a second mapping table based on the first mapping table. When editing the second mapping table, the memory controller determines whether M consecutive logical addresses have been recorded in the first mapping table. When the memory controller determines that M consecutive logical addresses have been recorded in the first mapping table, the memory controller edits the second mapping table according to a data compression rate (R), such that one or more fields, which correspond to one or more logical addresses recorded in the first mapping table, of the second mapping table are skipped and not edited. M and R are positive integers greater than 1.

16 Claims, 4 Drawing Sheets

Table_2(Compressed)

| 10,0 |
|------|
|      |
|      |
|      |
|      |
|      |
|      |
|      |
|      |
|      |
|      |
|      |
|      |

...

| 10,128 |
|--------|
|        |
|        |

Table_2(Decompressed)

| 10,0 |
|------|
| 10,1 |
| 10,2 |
| 10,3 |
| 10,4 |
| 10,5 |
| 10,6 |
| 10,7 |
| 10,8 |
| 10,9 |
| 10,10 |
| 10,11 |
| 10,12 |
| 10,13 |

...

| 10,128 |
|--------|
| 10,129 |
| 10,130 |

FIG. 4

DATA STORAGE DEVICES AND DATA PROCESSING METHODS OF SKIPPING EDITING OF FIELDS IN H2F TABLE WHEN CONSECUTIVE ADDRESSES ARE PRESENT IN F2H TABLE

CROSS REFERENCE TO RELATED APPLICATIONS

This Application claims priority of Taiwan Patent Application No. 108117321, filed on May 20, 2019, the entirety of which is incorporated by reference herein.

BACKGROUND OF THE INVENTION

Field of the Invention

The invention relates to a data storage device and a data processing method, which is capable of speeding up the write operation of a memory device.

Description of the Related Art

With the rapid growth of data storage technology in recent years, many data storage devices—such as memory cards manufactured in compliance with the SD/MMC standards, CF standards, MS standards or XD standards, as well as solid state hard drives, Embedded Multi Media Cards (eMMC) and Universal Flash Storage (UFS)—have been used widely for a variety of purposes. Therefore, effective control of access to these data storage devices is an important issue.

In order to improve the access performance of the data storage device, a novel data processing method which is capable of effectively processing the data stored in the memory device and improving the access performance of the memory device is proposed.

BRIEF SUMMARY OF THE INVENTION

Data storage devices and data processing methods are provided. An exemplary embodiment of a data storage device comprises a memory device and a memory controller. The memory controller comprises a plurality of memory blocks, and each memory block comprises a plurality of pages. The memory controller is coupled to the memory device and configured to access the memory device. The memory controller is configured to select a predetermined memory block to receive data and accordingly record a plurality of logical addresses in a first mapping table, wherein the memory controller comprises a buffer memory, the first mapping table is stored in the buffer memory and records which logical page the data stored in each physical page of the predetermined memory block is directed to. When the predetermined memory block is full, the memory controller is configured to edit a second mapping table based on the first mapping table, wherein the second mapping table corresponds to a plurality of logical pages and records which physical page of which memory block the data corresponding to the logical pages is stored in. When the memory controller edits the second mapping table, the memory controller is further configured to determine whether a predetermined number (M) of consecutive logical addresses have been recorded in the first mapping table, when the memory controller determines that the predetermined number (M) of consecutive logical addresses have been recorded in the first mapping table, the memory controller is configured to edit the second mapping table according to a data compression rate (R), such that one or more fields, which correspond to one or more logical addresses recorded in the first mapping table, of the second mapping table are skipped and not edited by the memory controller. The predetermined number (M) and the data compression rate (R) are positive integers greater than 1.

An exemplary embodiment of a data processing method for a data storage device comprising a memory device and a memory controller, wherein the memory device comprises a plurality of memory blocks, each memory block comprises a plurality of pages, and the memory controller is coupled to the memory device and configured to access the memory device. The method is performed by the memory controller and comprises: selecting a predetermined memory block to receive data and accordingly recording a plurality of logical addresses in a first mapping table, wherein the first mapping table is stored in a buffer memory of the memory controller and records which logical page the data stored in each physical page of the predetermined memory block is directed to; and when the predetermined memory block is full, editing a second mapping table based on the first mapping table, wherein the second mapping table corresponds to a plurality of logical pages and records which physical page of which memory block the data corresponding to the logical pages is stored in. The step of editing the second mapping table based on the first mapping table further comprises: determining whether the first mapping table has recorded a predetermined number (M) of consecutive logical addresses; when the first mapping table has recorded the predetermined number (M) of consecutive logical addresses, editing the second mapping table according to a data compression rate (R), such that one or more fields, which correspond to one or more logical addresses recorded in the first mapping table, of the second mapping table are skipped and not edited, wherein the predetermined number (M) and the data compression rate (R) are positive integers greater than 1; and when the first mapping table has not recorded the predetermined number (M) of consecutive logical addresses, sequentially editing corresponding fields of the second mapping table according to the logical addresses recorded in the first mapping table.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 4 shows the exemplary mapping tables according to an embodiment of the invention.

DETAILED DESCRIPTION OF THE INVENTION

In order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof. The scope of the invention is determined by reference to the appended claims.

Figure 1:
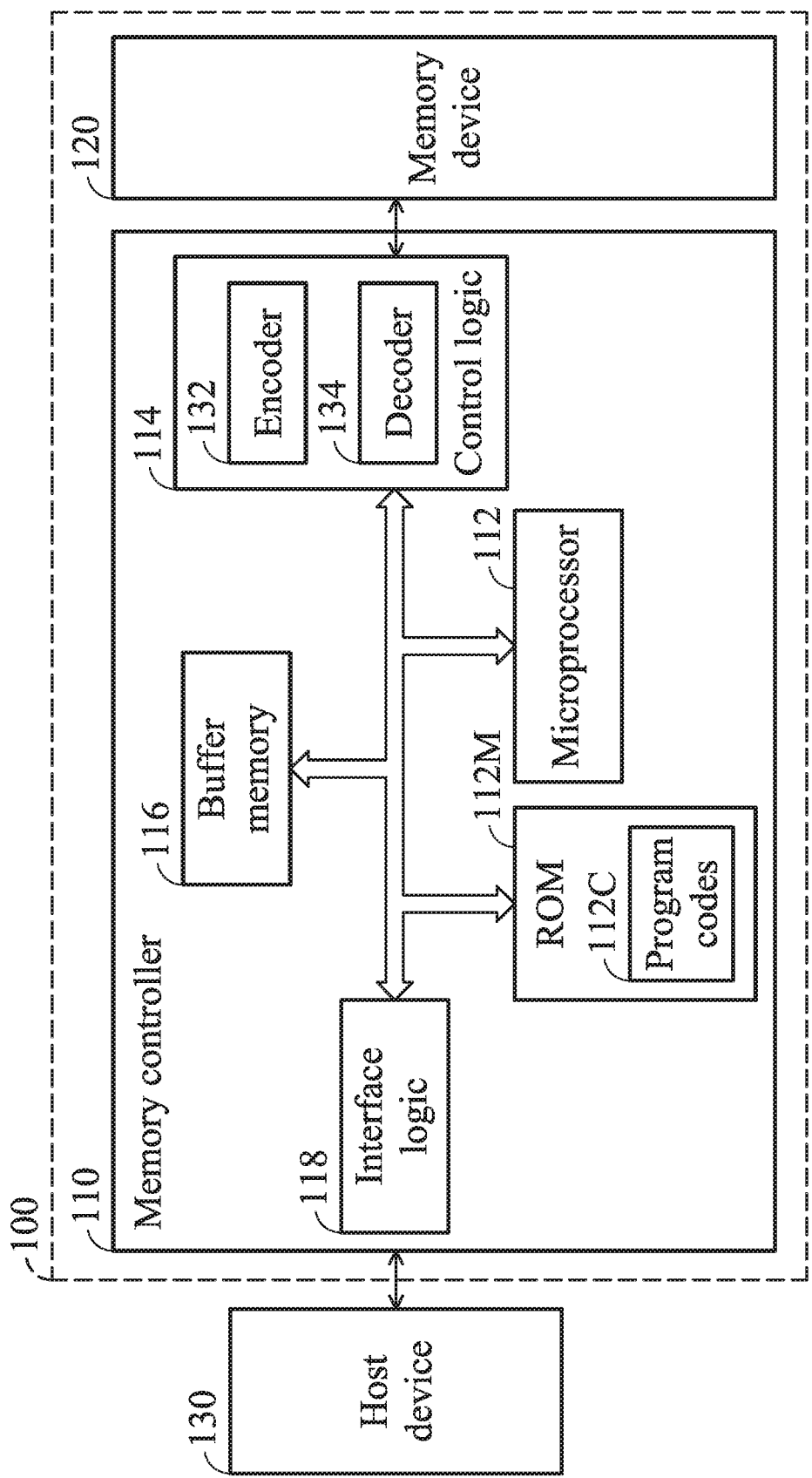
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120, such as a flash memory module, and a memory controller 110. The memory controller 110 is configured to access the memory device 120. According to an embodiment of the invention, the memory controller 110 may comprise a microprocessor 112, a Read Only Memory (ROM) 112M, a control logic 114, a buffer memory 116 and an interface logic 118. The ROM 112M is configured to store program codes 112C. The microprocessor 112 is configured to execute the program codes 112C, thereby controlling access to the memory device 120. The control logic 114 may comprise an encoder 132 and a decoder 134. The encoder 132 is configured to encode the data to be written into the memory device 120 so as to generate corresponding correcting/checking code (also called error correction code (ECC)). The decoder 134 is configured decode the data read out from the memory device 120.

Typically, the memory device 120 may comprise a plurality of flash memory chips, and each flash memory chip may comprise a plurality of memory blocks. The access unit of an erase operation performed by the controller (e.g., the memory controller 110, through the execution of the program codes 112C by the microprocessor 112) on the memory device 120 may be one memory block. In addition, a memory block may record (comprise) a predetermined number of pages, that is, the physical pages, and the access unit of a write operation performed by the controller (e.g., the memory controller 110, through the execution of the program codes 112C by the microprocessor 112) on the memory device 120 may be one page.

In practice, the memory controller 110 may perform various control operations by using its own internal components through the execution of the program codes 112C by the microprocessor 112. For example, the memory controller 110 may use the control logic 114 to control the access operations (especially the access operation for at least a memory block or at least a page) of the memory device 120, use the buffer memory 116 to perform necessary data buffer operations, and use the interface logic 118 to communicate with a host device 130. In an embodiment of the invention, the memory controller 110 may use the interface logic 118 to communicate with a host device 130 in compliance with a standard communication protocol. For example, the standard communication protocol may comprise (but not limited to) the Universal Serial Bus (USB) standard, the Secure Digital (SD) interface standard, the Ultra High Speed-I (UHS-I) interface standard, the Ultra High Speed-II (UHS-II) interface standard, the Compact Flash (CF) interface standard, the Multimedia Card (MMC) interface standard, the Embedded Multimedia Card (eMMC) interface standard, the Universal Flash Storage (UFS) interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a Random Access Memory (RAM). For example, the buffer memory 116 may be an SRAM, but the invention should not be limited thereto.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the Universal Flash Storage (UFS) or the Embedded Multi Media Card (EMMC) standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

According to an embodiment of the invention, the memory blocks comprised in the memory device 120 may be configured as the Single-Level Cell (SLC) memory blocks, the Multiple-Level Cell (MLC) memory blocks and/or the Triple-Level Cell (TLC) memory blocks. The memory cell of the SLC memory block is configured to store one bit data, the memory cell of the MLC memory block is configured to store two bits of data, and the memory cell of the TLC memory block is configured to store three bits of data.

Generally, the memory device 120 may be divided into three regions, comprising a system region, a data region and a spare region. The memory controller 110 is configured to select a predetermined memory block from the spare region as a cache memory, or called a buffer, to receive data and buffer the data. When the predetermined memory block (that is, the buffer) is full (that is, has been fully written with data), the memory controller may further update the predetermined memory block currently being utilized as a buffer as a data block in the data region. For example, when the predetermined memory block currently being utilized as a buffer to receive data is an MLC or a TLC memory block, when the buffer is full, the predetermined memory block may be directly updated as a data block in the data region. When the predetermined memory block currently being utilized as a buffer to receive data is an SLC memory block, when a predetermined number of buffers are full, the memory controller may perform a garbage collection procedure to move the data stored in the buffers to an MLC or a TLC memory block (the destination memory block) and update the destination memory block as a data block in the data region.

According to an embodiment of the invention, the memory controller 110 is configured to maintain a first mapping table in the buffer memory 116. When using the predetermined memory block to receive data, the memory controller 110 is configured to accordingly store a plurality of logical addresses in the first mapping table. According to an embodiment of the invention, the first mapping table is a Flash to Host (F2H) mapping table. The first mapping table comprises a plurality of fields. One field records the corresponding mapping information of one physical page of the predetermined memory block. That is, each field in the first mapping table Table_1 records which logical page the data stored in the corresponding physical page of the predetermined memory block is directed to (corresponding to). For example, the first mapping table may record the Logical Block Address (LBA) of a corresponding logical page, or may record the logical address of a logical page in other format.

According to an embodiment of the invention, the first mapping table records the logical addresses in the form of an array. A field in the array of the first mapping table corresponds to a physical page of the predetermined memory block. That is, the value of the array index of the first mapping table has a one-to-one mapping relationship with the index or the page number of the physical page of the predetermine memory block. For example, suppose that a starting array index of the first mapping table is 0, the logical address recorded in the first record in the first mapping table Table_1, that is, Table_1[0], is the address of the logical page that the data stored in the first physical page of the predetermined memory block is directed to. Similarly, the logical address recorded in the second record in the first mapping table Table_1, that is, Table_1[1], is the address of the logical page that the data stored in the second physical page of the predetermined memory block is directed to, and so on.

According to an embodiment of the invention, the memory controller 110 may sequentially write the data into the physical pages of the predetermined memory block according to the physical page number in an ascending manner. Therefore, the memory controller 110 may also record the logical address of the logical page corresponding to each physical page of the predetermined memory block in the first mapping table Table_1 according to the array index in an ascending manner. However, it should be noted that the invention is not limited to program the predetermined memory block according to the physical page number in an ascending manner.

According to an embodiment of the invention, when the predetermined memory block is full, the edition of the first mapping table Table_1 is completed, accordingly. Theoretically, the first mapping table Table_1 records the latest Flash to Host mapping information. When the memory controller 110 finishes the edition of the first mapping table Table_1, the memory controller 110 is configured to edit the second mapping table Table_2 according to the content recorded in the first mapping table Table_1, so as to update the latest mapping information to the second mapping table Table_2.

According to an embodiment of the invention, the second mapping table Table_2 may be stored in the system region of the memory device 120. The second mapping table Table_2 may be a Host to Flash (H2F) mapping table. The data recorded in the second mapping table Table_2 corresponds to a plurality of logical pages. Generally, the number of fields comprised in the second mapping table Table_2 is related to the number of logical pages comprised in the system of the host device 130, where one field of the second mapping table Table_2 corresponds to one logical page of the host device system, so as to record the mapping information of the corresponding logical page. That is, each field in the second mapping table Table_2 records which memory block and which physical page the data of the corresponding logical page is directed to (in other words, which memory block and which physical page the data of the corresponding logical page is stored in). According to an embodiment of the invention, the host device system may be a system comprising the host device 130 and the data storage device 100, or may be a system further comprising one or more peripheral devices coupled to the host device 130.

According to an embodiment of the invention, the second mapping table Table_2 may record a memory block number and a page number that correspond to each logical page in the form of an array, so as to record which memory block and which physical page data of each logical page is directed to (that is, which memory block and which physical page the data of each logical page is stored in). As discussed above, one field of the second mapping table Table_2 corresponds to one logical page. Therefore, the value of the array index of the second mapping table has a one-to-one mapping relationship with the index or the number of the logical page. For example, suppose that a starting array index of the second mapping table Table_2 is 0, the memory block number and the page number recorded in the first field of the second mapping table Table_2 (that is, the first record Table_2[0] recorded in the second mapping table Table_2), is the physical memory block number and the physical page number that the data of the first logical page of the host device system is stored in, the memory block number and the page number recorded in the second field of the second mapping table Table_2, (that is, the second record Table_2[1] recorded in the second mapping table Table_2), is the physical memory block number and the physical page number that the data of the second logical page of the host device system is stored in, and so on.

According to an embodiment of the invention, when editing the second mapping table Table_2, the memory controller 110 is configured to start from the starting array index of the first mapping table Table_1 to sequentially check the logical addresses recorded in the first mapping table Table_1, and look up the information stored in the second mapping table Table_2 according to the logical addresses recorded in the first mapping table to find the content recorded in corresponding positions of the second mapping table Table_2. The memory controller 110 is further configured to update the content recorded in the second mapping table Table_2 according to the memory block number of the predetermined memory block and a corresponding array index of the first mapping table Table_1.

For example, the content recorded in the first field of the first mapping table Table_1 Table_1[0] is 0, which means that the data stored in the first physical page of the predetermined memory block is directed to the logical page with the logical address 0. The memory controller 110 then looks up the content of the second mapping table Table_2 according to this logical address and loads one or a plurality of records including the record of this logical address into the buffer memory 116, so as to edit or update the content of the second mapping table Table_2. For example, the memory controller 110 may access the $1^{st}$ to $1024^{th}$ records recorded in the second mapping table Table_2 and load the content of the $1^{st}$ to $1024^{th}$ records into the buffer memory 116. Then, the memory controller 110 may update the content of the second mapping table Table_2 according to the memory block number of the predetermined memory block and a corresponding array index of the first mapping table Table_1. It should be noted that since the portion of the second mapping table Table_2 loaded in the buffer memory 116 for content updating or editing is a copy of the second mapping table Table_2 stored in the memory device 120, in the embodiments of the invention, the portion of the second mapping table Table_2 loaded in the buffer memory 116 is also referred to as the second mapping table Table_2.

According to an embodiment of the invention, in order to speed up the operation of editing the second mapping table Table_2, the memory controller 110 may dynamically compress the data stored in the second mapping table Table_2. In this manner, the operation of editing a portion of fields of the second mapping table Table_2 as discussed above will be skipped by the memory controller 110. For example, the memory controller 110 may compress the content of the second mapping table Table_2 at the time when editing/updating the second mapping table Table_2 according to the content stored in the first mapping table Table_1 as discussed above, and decompress (restore) the content of the second mapping table Table_2 when required or in the idle mode. In this manner, the execution of a write operation (including the edition and update of the content of the mapping tables) of the memory controller 110 can be sped up.

Figure 2:
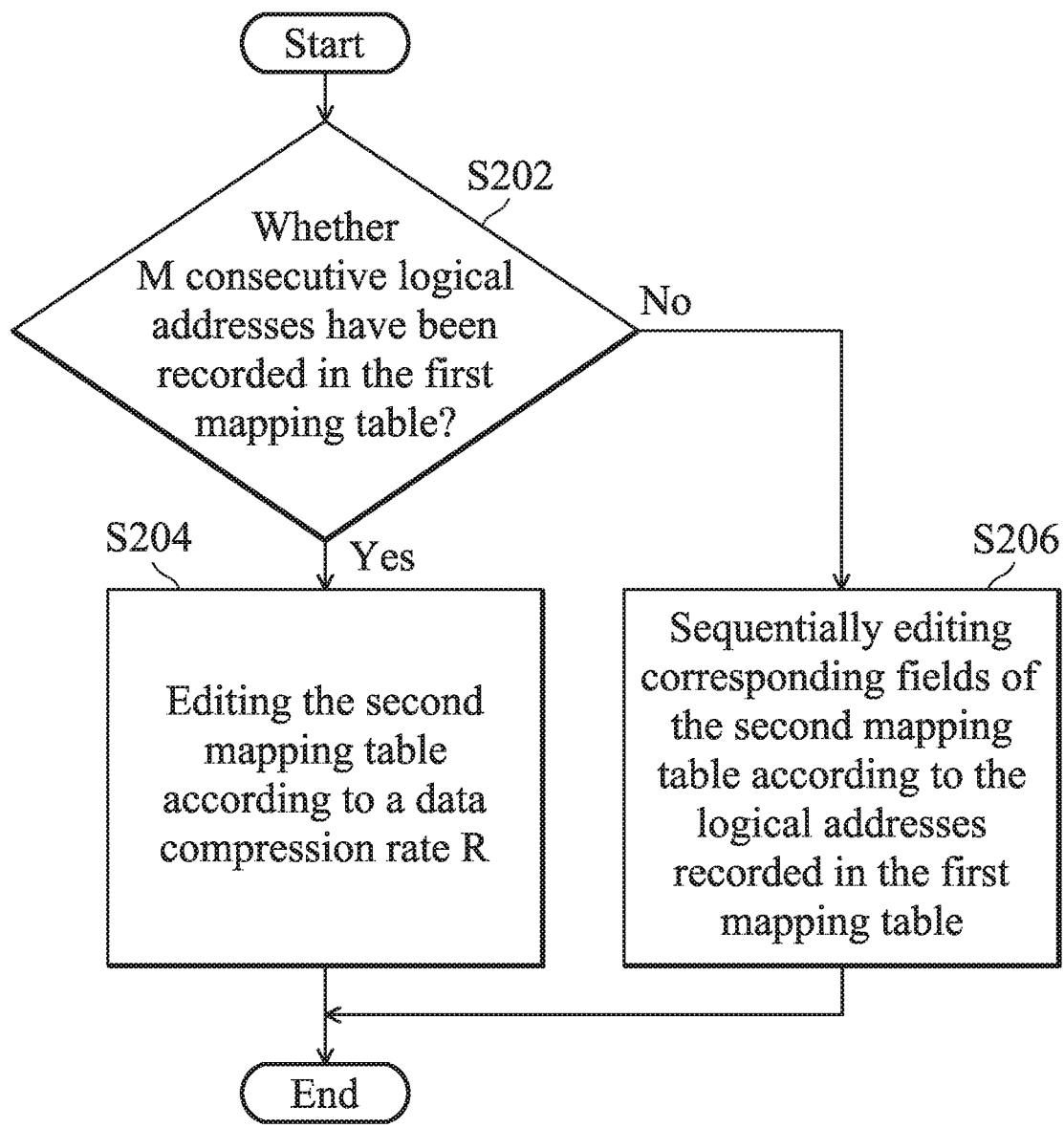
FIG. 2 is an exemplary flow chart of a data processing method according to an embodiment of the invention.

FIG. 2 is an exemplary flow chart of a data processing method according to an embodiment of the invention. As discussed above, the memory controller 110 is configured to select a predetermined memory block to receive data and accordingly record a plurality of logical addresses in the first mapping table Table_1. When the predetermined memory block is full, the memory controller is configured to edit the second mapping table Table_2 based on the first mapping table Table_1. According to an embodiment of the invention, when the memory controller 110 edits the second mapping table Table_2 based on the first mapping table Table_1, the memory controller 110 first determines whether a predetermined number (M) of consecutive logical addresses have been recorded in the first mapping table (Step S202). For example, the memory controller 110 may check the content stored in the first mapping table Table_1 to determine whether there are M consecutive logical addresses recorded in the first mapping table Table_1. When the logical addresses recorded in M consecutive fields of the first mapping table Table_1 are consecutive logical addresses, the memory controller 110 can determine that the first mapping table has recorded M logical addresses.

As another example, there may be a hardware device (not shown in the figure) configured inside of the data storage device 100 and being configured to check whether there are any consecutive logical addresses recorded in the mapping table. If so, the hardware device may further provide the information regarding the starting field index (for example, the array index) and the end field index of the fields recording the consecutive logical addresses, the starting address and the end address of the consecutive logical addresses, the range of the consecutive logical addresses, or the likes, to the memory controller 110. Based on the information, the memory controller 110 may determine whether the first mapping table Table_1 has recorded the logical addresses of M consecutive logical pages.

When the memory controller 110 determines that the first mapping table Table_1 has recorded the predetermined number (M) of consecutive logical addresses, the memory controller is configured to edit the second mapping table according to a data compression rate (R) (Step S204). In this manner, the operation of editing the second mapping table Table_2 can be effectively sped up. When the memory controller 110 determines that the first mapping table Table_1 has not recorded the predetermined number (M) of consecutive logical addresses, the memory controller 110 is configured to sequentially edit corresponding fields of the second mapping table Table_2 according to the logical addresses recorded in the first mapping table Table_1 (Step S206). The operation of editing the second mapping table Table_2 may comprise recording the memory block number of the predetermined memory block and a corresponding array index of the first mapping table Table_1 in a corresponding field of the second mapping table Table_2, so as to update the latest (that is, the most recently updated) logical address to physical address mapping information to the second mapping table Table_2.

Before the memory controller 110 has to read other records recorded in the second mapping table Table_2 (for example, the $1025^{th}$ to $2048^{th}$ records) or when the memory controller 110 determines that the information recorded in the first mapping table Table_1 has all been updated to the second mapping table Table_2, the memory controller 110 is configured to write the content of the second mapping table Table_2 buffered in the buffer memory 116 back to the system region of the memory device 120.

According to an embodiment of the invention, the predetermined number M and the data compression rate R may both be positive integers greater than 1. According to an embodiment of the invention, the predetermined number M is an integer multiple of the data compression rate R. In another embodiment of the invention, the predetermined number M and the data compression rate R may be set to the same positive integer.

According to an embodiment of the invention, when the memory controller 110 edits the second mapping table Table_2 according to the data compression rate R, for the information recorded in R consecutive fields in the first mapping table Table_1, the memory controller 110 only stores the corresponding information in one field of the second mapping table Table_2 as the representative information, and skip editing of the remaining (R-1) fields of the second mapping table Table_2, so that the corresponding information of the remaining (R-1) fields of the second mapping table Table_2 is not written in the second mapping table Table_2. It should be noted that the information recorded in R consecutive fields is consecutive logical addresses. In other words, in the embodiment of the invention, although the first mapping table Table_1 records the latest Flash to Host mapping information, the memory controller 110 does not update the content of all the fields of the second mapping table Table_2 that correspond to the logical addresses recorded in the first mapping table Table_1 to the latest information. Therefore, a portion of the mapping information recorded in the first mapping table Table_1 is not accordingly recorded in the second mapping table Table_2. For the compressed second mapping table Table_2, since the contents of the remaining (R-1) fields have not been updated to the latest information, the memory controller 110 temporarily doesn't care about the contents in the remaining (R-1) fields.

Figure 3:
FIG. 3 shows the exemplary mapping tables according to an embodiment of the invention.

FIG. 3 shows the exemplary mapping tables to illustrate the operation of editing the second mapping table Table_2 according to the first mapping table Table_1 according to an embodiment of the invention. In this embodiment, in this embodiment, suppose that M and R are both 128, and the first mapping table Table_1 comprises at least 128 consecutive logical addresses. As shown in FIG. 3, the content recorded in the first field Table_1[0] of the first mapping table Table_1 is 0, meaning that the data stored in the first physical page of the predetermined memory block is directed to the logical page with logical address 0. The memory controller 110 may access the content of the second mapping table Table_2 stored in the memory device 120 according to this logical address and load one or a plurality of records including the record of this logical address into the buffer memory 116, so as to edit or update the content of the second mapping table Table_2. For example, the memory controller 110 may access the $1^{st}$ to $1024^{th}$ records recorded in the second mapping table Table_2 and load the content of the $1^{st}$ to $1024^{th}$ records into the buffer memory 116.

In this embodiment, since the first mapping table Table_1 comprises at least 128 consecutive logical addresses, the memory controller 110 may select one field of the second mapping table Table_2 among the 128 fields which correspond to these 128 consecutive logical addresses and store the corresponding information (mapping information) in this field as the representative information. In addition, the memory controller 110 may skip editing the remaining 127 fields of the second mapping table Table_2, so that the corresponding information of the remaining 127 fields of the second mapping table is not written in the second mapping table Table_2. In this manner, the operation of editing the mapping table can be sped up. As shown in FIG. 3, suppose that the memory block number of the predetermined memory block is 10, and the arrangement of the number or index of the physical page is started from 0, the memory controller 110 may write the content (10,0) in the first field of the second mapping table Table_2 as shown in FIG. 3 as the representative information for the $1^{st}$~$128^{th}$ fields of the second mapping table Table_2, where the number 0 is the page number of the first physical page of the predetermined memory block.

Next, if the first mapping table Table_1 further records 128 consecutive logical addresses from the $129^{th}$ field, since the content recorded in the $129^{th}$ field of the first mapping table Table_1 is 128, the memory controller 110 may direct jump to the $129^{th}$ field of the second mapping table Table_2 and write the content (10,128) in the $129^{th}$ field of the second mapping table Table_2 as the representative information for the $129^{st}$~$256^{th}$ fields of the second mapping table Table_2, where the number 128 is the page number of the $129^{th}$ physical page of the predetermined memory block.

According to an embodiment of the invention, since the number of fields comprised in the second mapping table Table_2 is related to the number of logical pages comprised in the system of the host device 130, the second mapping table Table_2 stored in the memory device 120 may actually cross a plurality of physical pages. For example, suppose that the size of a host page (HP) or the size of one logical page is set to 4 K Bytes, and the size required by each field of the second mapping table Table_2 is 4 Bytes, meaning that each field of the second mapping table Table_2 uses 4 Bytes to record the corresponding data, and the size of one physical page is 16 K Bytes, then one physical page can record the information of 4 K fields. That is, one physical page can record the mapping information of 4 K logical pages (logical addresses), and the amount of data will be 4 K*4 KB=16 MB (Mega Bytes). Therefore, for the memory device 120 having a capacity (that is, memory size) of 256 G Bytes, the size of the second mapping table Table_2 has to be maintained will be 256 MB, which is equal to 16384 (16 K) physical pages.

Therefore, according to an embodiment of the invention, the predetermined number M and the data compression rate R may be determined according to the number of fields of the second mapping table Table_2 that can be recorded in one physical page. As recited in the aforementioned example, in an embodiment of the invention, the predetermined number M and the data compression rate R may be set to 4 K. In this manner, after compression, for one physical page utilized for storing the content of the second mapping table Table_2, the memory controller 110 may only edit one field among the 4 K field as representative. It should be noted that the invention is not limited to only set the predetermined number M and the data compression rate R to the number of fields of the second mapping table Table_2 that can be recorded in one physical page, and is also not limited to set the predetermined number M and the data compression rate R as the same value. For example, the predetermined number M may be an integer multiple, such as 4 times, of the data compression rate R. Therefore, after compression, for one physical page utilized for storing the content of the second mapping table Table_2, the memory controller 110 may only edit four fields as representative.

According to an embodiment of the invention, the memory controller 110 may further store the compression information in the spare region of the physical page utilized for storing the content of the second mapping table Table_2. The compression information may comprise the information regarding whether the content that is supposed to be stored in this physical page has been compressed, the data compression rate R for executing the compression, the range (for example, the field indices) of the compression, the unit of consecutive logical addresses (for example, the predetermined number M), or others.

In addition, according to an embodiment of the invention, the memory controller 110 may further record the compression information in a third mapping table Table_3. As discussed above, since the second mapping table Table_2 corresponds to a great amount of logical addresses, the second mapping table Table_2 stored in the memory device 120 may actually cross a plurality of physical pages. According to an embodiment of the invention, the memory controller 110 may establish a third mapping table Table_3 in the memory device 120 for recording the management information of the second mapping table Table_2, which is helpful for the memory controller 110 to manage the second mapping table Table_2. The third mapping table Table_3 is configured to record the physical address of each physical page storing the second mapping table Table_2. By looking up the content stored in the third mapping table Table_3, the memory controller 110 can know which memory block and which physical page of the memory device 120 the mapping information recorded in the second mapping table Table_2 is actually stored in. Therefore, when the memory controller 110 has to access the content stored in a specific field of the second mapping table Table_2 (that is, the H2F mapping information of a specific logical page), the memory controller 110 may first look up the content of the third mapping table Table_3, to obtain the information regarding which memory block and which physical page the H2F mapping information of the specific logical page is actually stored in, and then access the corresponding physical memory block and the physical page according to the obtained information, so as to obtain the content of the H2F mapping information of the specific logical page stored in the second mapping table Table_2.

According to an embodiment of the invention, the memory controller 110 may also store the compression information in the third mapping table Table_3. The compression information may comprise the information regarding the content of which physical page utilized for storing the second mapping table Table_2 has been compressed, the data compression rate R for executing the compression, the range (for example, the field indices) of the compression, the unit of consecutive logical addresses (for example, the predetermined number M), or others. For example, the memory controller 110 may establish a bit table in the third mapping table Table_3. The mapping table may comprise a plurality of bits. One bit may correspond to one physical page utilized for storing the content of the second mapping table Table_2, so as to indicate whether the content stored in the corresponding page has been compressed or not.

In addition, since the content stored in the second mapping table Table_2 may have been compressed, according to an embodiment of the invention, when the memory controller has to access a specific field of the second mapping table Table_2 in response to a read command, the memory controller 110 may determine whether the content of the physical page utilized for storing the corresponding information of the specific field has been compressed, or determine whether the corresponding information of the specific field has not been written in the second mapping table Table_2 due to the compression, according to the compression information recorded in the third mapping table Table_3 or the compression information recorded in the spare region of the corresponding physical page. When the memory controller 110 determines that the content of the physical page utilized for storing the corresponding information of the specific field has been compressed or the corresponding information of the specific field has not been written in the second mapping table Table_2 due to the compression, the memory controller 110 may further derive the corresponding information of the specific field according to content that has been stored in the second mapping table and the data compression rate R.

For example, suppose that the data compression rate R=128, the memory controller 110 may take each 128 consecutive logical addresses as a compression group for performing the compression. Before the content of the second mapping table Table_2 has been restored, when the memory controller 110 has to query the mapping information of a specific logical address, the memory controller 110 may divide the specific logical address by the data compression rate R to obtain which compression group that the specific logical address belongs to, and look up the mapping information stored in the second mapping table Table_2 as the representative information for this compression group. Next, the memory controller may derive the mapping information of the specific logical address according to the obtained mapping information.

For example, suppose that the specific logical address is 65, the memory controller 110 may first divide 65 by 128 (the data compression rate R) and the obtained quotient is the value to indicate which compression group the specific logical address belongs to (for example, the obtained quotient 0 represents the number (or index) of the compression group, that is, the first compression group, wherein in this embodiment, the logical address 0~127 belong to the first compression group, the logical address 128~255 belong to the second compression group, and so on). The obtained remainder indicates the offset of this specific logical address in the corresponding compression group. Next, the memory controller 110 may look up the mapping information stored in the second mapping table Table_2 as the representative information for this compression group. For example, when the compression mechanism adopted by the memory controller 110 is to store the mapping information of the first logical address comprised in this compression group as the mapping information representing this compression group, the memory controller 100 may look up the content stored in the first field of the corresponding compression group in the second mapping table Table_2. Take the exemplary mapping tables shown in FIG. 3, the memory controller 110 may obtain the mapping information (10,0) recorded in the first field of the second mapping table Table_2. In this manner, the memory controller 110 knows that the data of the specific logic address 65 is stored in the memory block having the memory block number 10. Next, the memory controller 110 may further add the offset 65 to the physical page number 0 in the obtained mapping information and know that the data of the specific logic address 65 is stored in the physical page having the physical page number 65 (that is, the 66$^{th}$ page of the memory block having the memory block number 10).

It should be noted that that the aforementioned method of deriving the required mapping information may be adjusted based on the compression mechanism adopted by the memory controller 110. For example, when compression mechanism adopted by the memory controller 110 is to store the mapping information of the last logical address comprised in a compression group as the mapping information representing this compression group, the memory controller 110 is configured to look up the content stored in the last field of the corresponding compression group in second mapping table Table_2 and derive the mapping information of the specific logical address according to the mapping information stored in the last field.

In addition, since the contents stored in the second mapping table Table_2 may have been compressed, according to an embodiment of the invention, when the memory controller 110 has to update content of a specific field in the second mapping table Table_2 in response to a write operation, the memory controller 110 may determine whether the content of the physical page utilized for storing the corresponding information of the specific field has been compressed, or determine whether the mapping information of the compression group that the specific field belongs to has been compressed, according to the compression information recorded in the third mapping table Table_3 or the compression information recorded in the spare region of the corresponding physical page. When the memory controller 110 determines that the content of the physical page utilized for storing the corresponding information of the specific field has been compressed or the mapping information of the compression group that the specific field belongs to has been compressed, meaning that the content corresponding to the specific field has been compressed. When the memory controller 110 determines that the content corresponding to the specific field that has to be updated has been compressed, the memory controller 110 is configured to restore the information of a portion of fields that has not been edited due to the skip of editing the second mapping table Table_2 according to content that has been stored in the second mapping table Table_2, so as to decompress the second mapping table Table_2.

It should be noted that in the embodiment of the invention, even if the corresponding mapping information has already been stored in the specific field of the second mapping table Table_2, the mapping information stored in the specific field may be the representative information of the compression group that the specific field belongs to. Once the mapping information of the specific field has to be modified or updated, the mapping information currently being stored in the specific field can no longer be the representative information representing the compression group that it belongs to. Therefore, the memory controller 110 have to determine whether to decompress (restore) the content of the second mapping table Table_2 based on whether the mapping information of the compression group that the specific field belongs to has been compressed instead of determining whether the mapping information of the specific field has already been stored in the second mapping table Table_2. When the mapping information of the compression group that the specific field belongs to has been compressed, even if the mapping information of the specific field has already been stored in the second mapping table Table_2, the memory controller 110 still has to restore the content of the second mapping table Table_2 by decompressing the second mapping table Table_2 at the time when the mapping information corresponding to the specific field has to be modified or updated.

FIG. 4 shows the exemplary mapping tables to illustrate the operation of restoring the content of the second mapping table Table_2 by decompressing the second mapping table Table_2 according to an embodiment of the invention. FIG. 4 shows the content of the compressed second mapping table Table_2 on the left hand side and the content of the decompressed second mapping table Table_2 on the right hand side. According to an embodiment of the invention, the memory controller 110 may restore the corresponding information of one or more fields of the second mapping table Table_2 that have not been edited due to the skip of editing the second mapping table Table_2 according to the content that has been stored in the second mapping table Table_2, so as to decompress the second mapping table Table_2. For example, the memory controller 110 may look up the mapping information stored in the second mapping table Table_2 as the representative information for each compression group, and derive or calculate the mapping information of the one or more fields that have not been edited due to the skip of editing the second mapping table according to the representative information of the corresponding compression group, so as to decompress the second mapping table Table_2 and make each field in the second mapping table Table_2 of the corresponding compression group can be written with correct mapping information. Since the compression originates from the condition when a predetermined memory block has stored the data of a plurality of consecutive logical pages in a plurality of consecutive physical pages, the memory controller 110 can derive the mapping information of a plurality of fields that has not been edited due to the compression and the skip of editing the second mapping table by simply increasing or decreasing the representative mapping information of the corresponding compression group. Therefore, the operations of deriving the mapping information of the memory controller 110 will not be described further for brevity.

In addition to the aforementioned embodiments, according to an embodiment of the invention, the memory controller 110 may also determine whether the data storage device 100 is idle, and may perform a decompression of the second mapping table Table_2 in the background when the data storage device 100 is idle, so as to restore the mapping information of the fields that has not been edited in the second mapping table Table_2 due to the skip of editing the second mapping table Table_2. In addition, the memory controller 110 may further update the decompressed (re-stored) content of the second mapping table Table_2 that is buffered in the buffer memory 116 to the system region of the memory device 120 in the background when the data storage device 100 is idle. In this manner, the second mapping table Table_2 in the memory device 120 stores the latest mapping information.

According to an embodiment of the invention, the memory controller 110 may use a timer to count for a predetermined time period. If the host device 130 has not issued any command to the memory controller 110 when the timer expires, it is determined that the host device 130 is now idle. After the timer expires, the memory controller 110 may perform the decompression of the second mapping table Table_2 in the background. The operation of decompressing the second mapping table Table_2 may be referred to the example shown in FIG. 4 and the corresponding paragraphs, and descriptions are omitted here for brevity.

In addition, it should be noted that, when the memory controller 110 finishes the content decompression of one or more compression groups or one or more physical pages utilized for storing the content of the second mapping table Table_2, the memory controller 110 has to accordingly update the compression information stored in the second mapping table Table_2 and/or the third mapping table Table_3, such that the compression information stored therein can correctly reflect whether the content of each physical page or compression group of the second mapping table Table_2 has been compressed or not.

As discussed above, via the application illustrated in the aforementioned embodiments, the memory controller may set the number M of consecutive logical addresses that have to be compressed and the data compression rate R based on the system requirement, and may skip the operation of editing a large portion of fields via the compression operation illustrated above and only edit a few fields in the second mapping table Table_2 as representative information when updating the content of the second mapping table Table_2 in response to a write operation. In this manner, the execution of the write operation, including the edition and update of the content of the mapping tables, can be effectively sped up. Since the edit operations of a great number of fields of the second mapping table Table_2 are skipped at the time when the memory controller 110 executing the corresponding write operation, the execution of the write operation can be significantly sped up, especially when the host device 130 is configured to write a large amount of consecutive data to the memory device 120. In addition, the memory controller 110 may restore or decompress the content of the second mapping table Table_2 when required or in idle mode, and may further update the restored mapping information to the memory device 120, so as to facilitate access to the second mapping table Table_2 in the future.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data storage device, comprising:
a memory device, comprising a plurality of memory blocks, each memory block comprising a plurality of physical pages;
and a memory controller, coupled to the memory device and configured to access the memory device, wherein the memory controller is configured to select a predetermined memory block to receive data and accordingly record a plurality of logical addresses in a first mapping table, wherein the memory controller comprises a buffer memory, the first mapping table is stored in the buffer memory and the first mapping table records which first logical page the data, stored in each first physical page of the predetermined memory block, is directed to, wherein when the predetermined memory block is full, the memory controller is configured to edit a second mapping table based on the first mapping table, wherein the second mapping table corresponds to a plurality of second logical pages and the second mapping table records which physical page of which memory block the data, corresponding to the plurality of second logical pages, is stored in, wherein when the memory controller edits the second mapping table, the memory controller is further configured to determine whether a predetermined number (M) of consecutive logical addresses have been recorded in the first mapping table, when the memory controller determines that the predetermined number (M) of consecutive logical addresses have been recorded in the first mapping table, the memory controller is configured to edit the second mapping table according to a data compression rate (R), such that one or more fields, which correspond to one or more of the plurality of logical addresses recorded in the first mapping table, of the second mapping table are skipped and not edited by the memory controller, wherein the predetermined number (M) and the data compression rate (R) are positive integers greater than 1.

2. The data storage device as claimed in claim 1, wherein the predetermined number (M) is an integer multiple of the data compression rate (R).

3. The data storage device as claimed in claim 1, wherein when the memory controller edits the second mapping table according to the data compression rate (R), for consecutive logical addresses recorded in R consecutive fields of the first mapping table, the memory controller only stores mapping information in one field of the second mapping table, and skips editing remaining (R-1) fields of the second mapping table, so that the mapping information of the remaining (R-1) fields of the second mapping table is not written in the second mapping table.

4. The data storage device as claimed in claim 1, wherein the memory controller further determines whether the data storage device is idle, and when the data storage device is idle, the memory controller is configured to decompress the second mapping table in the background to restore mapping information of the one or more fields.

5. The data storage device as claimed in claim 1, wherein when the memory controller has to update content of a field in the second mapping table in response to a write operation, the memory controller is configured to determine whether the content of the field in the second mapping table that has to be updated has been compressed or not, and when the memory controller determines that the content of the field has been compressed, the memory controller is configured to decompress the second mapping table to restore mapping information of the one or more fields according to content that has been stored in the second mapping table.

6. The data storage device as claimed in claim 1, wherein when the memory controller has to access a specific field of the second mapping table in response to a read command and when the memory controller determines that mapping information of the specific field is not stored in the second mapping table due to the one or more fields being skipped and not edited, the memory controller is configured to derive, according to content that has been stored in the second mapping table and the data compression rate (R), the mapping information of the specific field.

7. The data storage device as claimed in claim 1, wherein the second mapping table is stored in the buffer memory.

8. The data storage device as claimed in claim 1, wherein the memory controller is further configured to write content stored in the second mapping table into the memory device.

9. A data processing method for a data storage device, wherein the data storage device comprises a memory device and a memory controller, the memory device comprises a plurality of memory blocks, each memory block comprises a plurality of physical pages, the memory controller is coupled to the memory device and configured to access the memory device, and the method is performed by the memory controller and comprises:

selecting a predetermined memory block to receive data and accordingly recording a plurality of logical addresses in a first mapping table, wherein the first mapping table is stored in a buffer memory of the memory controller and the first mapping table records which first logical page the data, stored in each first physical page of the predetermined memory block, is directed to;

and when the predetermined memory block is full, editing a second mapping table based on the first mapping table, wherein the second mapping table corresponds to a plurality of second logical pages and the second mapping table records which physical page of which memory block the data, corresponding to the plurality of second logical pages, is stored in, wherein editing the second mapping table based on the first mapping table further comprises:

determining whether the first mapping table has recorded a predetermined number (M) of consecutive logical addresses;

when the first mapping table has recorded the predetermined number (M) of consecutive logical addresses, editing the second mapping table according to a data compression rate (R), such that one or more fields, which correspond to one or more of the plurality of logical addresses recorded in the first mapping table, of the second mapping table are skipped and not edited, wherein the predetermined number (M) and the data compression rate (R) are positive integers greater than 1;

and when the first mapping table has not recorded the predetermined number (M) of consecutive logical addresses, sequentially editing fields of the second mapping table according to the plurality of logical addresses recorded in the first mapping table.

10. The data processing method as claimed in claim 9, the predetermined number (M) is an integer multiple of the data compression rate (R).

11. The data processing method as claimed in claim 9, wherein editing the second mapping table according to the data compression rate (R) further comprises:

for consecutive logical addresses recorded in R consecutive fields of the first mapping table, only storing mapping information in one field of the second mapping table, and skipping editing of the remaining (R-1) fields of the second mapping table, so that the mapping information of the remaining (R-1) fields of the second mapping table is not written in the second mapping table.

12. The data processing method as claimed in claim 9, further comprising:

when the data storage device is idle, determining whether content stored in the second mapping table has been compressed or not;

and upon determining that the content stored in the second mapping table has been compressed, restoring mapping information of the one or more fields according to the content stored in the second mapping table, so as to decompress the second mapping table.

13. The data processing method as claimed in claim 9, wherein when the memory controller has to update content of a field in the second mapping table in response to a write operation, the method further comprises:

determining whether the content of the field in the second mapping table that has to be updated has been compressed or not;

and when the content of the field is determined to have been compressed, restoring mapping information of the one or more fields according to content that has been stored in the second mapping table, so as to decompress the second mapping table.

14. The data processing method as claimed in claim 9, wherein when the memory controller has to access a specific field of the second mapping table in response to a read command, the method further comprises:

determining whether mapping information of the specific field is not stored in the second mapping table due to the second mapping table being edited according to the data compression rate (R);

and when the mapping information of the specific field is not stored in the second mapping table due to the second mapping table being edited according to the data compression rate (R), deriving, according to content that has been stored in the second mapping table and the data compression rate (R), the mapping information of the specific field.

15. The data processing method as claimed in claim 9, wherein the second mapping table is stored in the buffer memory.

16. The data processing method as claimed in claim 9, further comprising:

writing content stored in the second mapping table into the memory device.

* * * * *